United States Patent [19]

Staniland

[11] Patent Number: 4,970,284

[45] Date of Patent: Nov. 13, 1990

[54] POLYARYLETHERKETONES

[75] Inventor: Philip A. Staniland, Middlesbrough, England

[73] Assignee: Imperial Chemical Industries PLC, London, England

[21] Appl. No.: 288,866

[22] Filed: Dec. 23, 1988

[30] Foreign Application Priority Data

Dec. 24, 1987 [GB] United Kingdom ............... 8730135

[51] Int. Cl.⁵ ................................................ C08G 8/02
[52] U.S. Cl. ................................... 528/125; 528/126; 528/128
[58] Field of Search ........................ 528/125, 126, 128

[56] References Cited

U.S. PATENT DOCUMENTS 4,668,744 5/1987 Matzner et al. .................... 528/125

FOREIGN PATENT DOCUMENTS 095448 7/1987 European Pat. Off. .
0211678 8/1988 European Pat. Off. .

Primary Examiner—John Kight, III
Assistant Examiner—P. Hampton-Hightower
Attorney, Agent, or Firm—Cushman, Darby & Cushman

[57] ABSTRACT

Polyetherketones including repeating units I and biphenylene or terphenylene connected by ether linkages exhibit high degrees of crystallinity after annealing and have high Tg/Tm ratios.

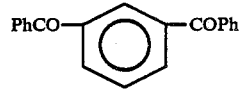

8 Claims, No Drawings

POLYARYLETHERKETONES

This invention relates to polyarylethers and in particular to such polymers which include ketone linkages between some of the aromatic rings.

Polyaryletherketones have been known for many years, for example from UK patent specification No. 971227 and U.S. Pat. No. 4,668,744, although the latter relates particularly to block copolyesters formed from polyaryletherketone and liquid crystalline polyesters.

It is an object of the present invention to provide polyaryletherketones which exhibit unexpectedly advantageous properties.

The abbreviation "Ph" is used in this specification to denote "1,4-phenylene".

According to a first aspect of the invention, there is provided a polyaryletherketone comprising repeating units of structures I and II:

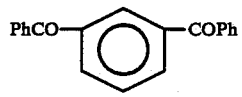

Ar,                        II wherein Ar is 4,4'-biphenylene or 4',4''-terphenylene, alone or in conjunction with other repeating units, the repeating units being connected by ether linkages.

The polyaryletherketones may also include repeating units of the structure III:

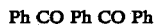                      III.

The molar amount of the structure III may be up to 90% of the combined molar amounts of the structures I and III, preferably up to 75%, more preferably up to 50% of said combined amount.

Polymers of the present invention may incorporate a minor proportion of further repeating units, for example 1,4-phenylene; 2,6-naphthylene; 4,4'-diphenylsulphone; 4,4'-diphenylketone; 1,4-bis(4-phenylsulphonyl) benzene; 4,4'-bis(4-benzoyl)biphenyl; and 4,4'-bis(4-phenylsulphonyl)biphenyl These or other repeating units used in aromatic polyethers may be present in a molar proportion which does not detract from the essential properties of the polymer for example up to 50% but generally no more than 20%. The units of structure I, or of structures I and III when III is present, preferably amount to 50 mole % of the polymer and preferably amount to not less than 20 mole % of the polymer. The units structure II preferably amount to 50 mole % of the polymer and preferably amount to not less than 20 mole % of the polymer.

The present invention provides novel polymers which exhibit an unexpectedly high degree of crystallinity. Previously known polyaryletherketones which incorporate 1,3-phenylene linkages have not been found to be sufficiently crystalline to be commercially useful.

The polymers of the present invention typically exhibit relatively high degrees of crystallinity, for example 30 to 60%, generally approximately 40% after annealing. Higher degrees of crystallinity may be observed in the polymer as synthesized prior to melt fabrication. These high degrees of crystallinity afford many uses for the polymers where solvent resistance is required or where orientation is required as in production of films or fibres.

In preferred polymers, Ar is Ph$_2$. These polymers are highly crystalline. Although the polymers do not crystallise under normal cooling conditions e.g. 20° min $^{-1}$, they may be crystallised by annealing, for example at 270° for several minutes. This property facilitates fabrication of films and thermoforming of sheets.

The relationship between melting points (Tm) and glass transition temperatures (Tg) of some of the polymers according to the invention has been found to be unexpectedly beneficial, particularly in conjunction with the aforementioned crystalline properties. Crystalline thermoplastics had been previously found to obey the rule that Tg(°K)/Tm(°K) is $\frac{1}{2}$ to $\frac{2}{3}$ (see Billmeyer, F W, Textbook of Polymer Science, Wiley Interscience, 1962, 212). However, some polymers of the present invention exhibit ratios of Tg(°K)/Tm(°K) of over 0.70 and up to approximately 0.75. The softening point (i.e. the glass transition temperature) is higher than that of polyarylketones PEEK (Tg=143° C.; Tm=334° C.) and PEK (Tg=150° C.; TM=365° C.) and the melting point, at which processing may be undertaken, is substantially lower.

A particularly useful monomer for use in synthesizing polymers according to the invention is 1,3-bis(4-fluorobenzoyl)benzene, the facile manufacture of which from economical precursors is a further benefit.

According to a second aspect of the invention, a film, fibre or solvent resistant article or composite material comprises a polyaryletherketone in accordance with the first aspect of the invention.

Whilst for many applications the polymers of the invention may be used with few if any additives, other than stabilisers, they may be used as polymer compositions containing one or more additives for example inorganic and organic fibrous fillers such as of glass, carbon or poly-paraphenylene terephthalamide; organic fillers such as polysulphones, polyketones, polyimides, polyester and polytetrafluoroethylene at various levels of compatibility; and vermiculite; nucleating agents; and stabilisers such as phosphates and combination thereof.

Typically the total content of additives is 0.1 to 80%, preferably at most 70%, by weight of the total composition. The composition can contain for example 5 to 30% by weight of boron nitride; or at least 20% by weight of short glass or carbon fibre; or 50 to 70%, preferably about 60% by volume of continuous glass or carbon fibre (see for example EP-A Nos. 56703, 102158 and 102159); or a mixture of a fluorine-containing polymer, graphite and an organic or inorganic fibrous filler and the total proportion of these additives is preferable 20 to 50% by weight of the total composition.

According to a third aspect of the present invention a process for forming a polyaryletherketone includes the step of polycondensing under substantially anhydrous conditions in the presence of a base at least one compound of structure IV

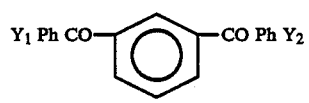

with at least one compound of structure V

Y$_3$Ar Y$_4$                  V wherein Ar and Ph are as hereinbefore defined, $Y_1$, $Y_2$ $Y_3$ and $Y_4$ are each independently halogen or OH, and, when $Y_3$ and/or $Y_4$ is halogen, the group Ar is such that the halogen is activated by an inert electron—withdrawing group in at least one of the positions ortho- or para- to the halogen, and the proportions of IV and V and the nature of $Y_1$, $Y_2$, $Y_3$ and $Y_4$ are chosen so that the halogen and the groups —OH are in substantially equimolar amounts.

We prefer that the halogen atoms be chlorine or, especially, fluorine. The use of substantially equimolar amounts of halogen and —OH groups is desirable since an excess of either results in a reduction in the molecular weight of the polymer obtained. A slight excess of either halogen or —OH groups may be used, for example an excess of up to 5 mole % especially up to 2 mole % and, in particular, an excess of halogen may be used to obtain the most stable polymers.

It is convenient to use compounds in which $Y_1$ and $Y_2$ are the same, for example both halogen, especially both fluorine or chlorine, and in which $Y_3$ and $Y_4$ are the same, for example both —OH groups. However, mixtures of compounds may be used such that in some compounds $Y_1$ and $Y_2$, or $Y_3$ or $Y_4$, are both halogen and in other compounds $Y_1$ and $Y_2$, or $Y_3$ and $Y_4$, are both —OH groups.

Compounds which may be used as the at least one compound of the formula $$Y_3—Ar—Y_4$$

include, inter alia 4,4'- dihydroxybiphenyl; and 4,4'''- dihydroxy para-terphenyl.

Minor proportions of the following additional reagents may be employed :
hydroquinone;
4,4' - dihydroxybenzophenone;
4,4' - difluorobenzophenone;
4,4' - dichlorodiphenylsulphone;
4,4' - dihydroxydiphenylsulphone;
bis - 1,4 - (4-fluorobenzoyl) benzene;
bis - 1,4 - (4-chlorobenzoyl) benzene:
bis - 1,4 - (4-hydroxybenzoyl) benzene;
bis - 1,4 - (4-chlorophenylsulphonyl) benzene;
bis - 4,4'- (4-chlorophenylsulphonyl) biphenyl;
1-(4-chlorophenylsulphonyl) -4- (4-fluorobenzoyl) benzene;
4-(4-chlorophenylsulphonyl) phenol; and
4-(4-fluorobenzoyl) phenol.

As indicated, the molecular weight of the polymer is influenced by the use of an excess quantity of halogen or —OH groups although slight excess of halogen or —OH groups, for example an excess of up to 5 mole % and especially of up to 2 mole %, may be used and may be employed to control the molecular weight of the polymer. Alternatively, the molecular weight may also be controlled by the inclusion in the reaction mixture of a small proportion, for example less than 1 mole %, and especially less than 0.1 mole % relative to the monomers, of a monofunctional compound such as a phenol or, preferably an activated arylmonohalide.

The polymerisation reaction may be carried out in the presence of an inert solvent or in the absence of a solvent.

Preferably a solvent is employed and is an aliphatic or aromatic sulphoxide or sulphone of formula $$R—S(O)_a—R'$$

where
a is 1 or 2; and
R or R', which may be the same or different, are alkyl or aryl groups, and may together form a divalent radical. Solvents of this type include dimethyl sulphoxide, dimethyl sulphone, and sulpholane (1,1-dioxothilan) but the preferred solvents are aromatic sulphones of the formula.

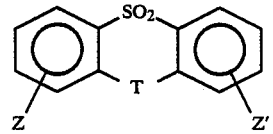

where
T is a direct link, an oxygen atom or two hydrogen atoms (one attached to each benzene ring); and
Z and Z', which may be the same or different, are hydrogen atoms, alkyl, alkaryl, aralkyl or aryl groups.

Examples of such aromatic sulphones include diphenylsulphone, ditolylsulphone, dibenzothiophen dioxide, phenoxathiin dioxide and 4-phenylsulphonyl biphenyl. Diphenylsulphone is the preferred solvent. Other solvents that may be used include N,N-dimethyl formamide N-methyl-2-pyrrolidone and benzophenone.

The polymerisation is effected in the presence of at least one base which is an alkali metal hydroxide, carbonate or bicarbonate.

If an alkali metal hydroxide is used, this is preferably pre-reacted with the phenol groups in the halophenol or bisphenol compounds used in the polycondensation to form an alkali metal halophenate or bisphenate. The salt should preferably be in a finely divided form, for example having a particle size of less than 1 mm, and preferably less than 500 micrometers.

If the base is an alkali metal carbonate or bicarbonate, these are preferably used as the anhydrous materials. However, if hydrated salts are employed, these may be dehydrated during the period of heating up to the polymerisation temperature when a sufficiently high polymerisation temperature is being used.

The alkali metal hydroxide, carbonate or bicarbonate should be used in at least the stoichiometric proportion with respect to the phenolic groups in the starting compounds.

It is preferred to use a slight excess of the base and this is preferably an excess of in the range from 1 to 25 mole %, particularly from 1 to 5 mole %, relative to the proportion of phenolic groups present in the compounds.

The inherent viscosity (IV) was measured in a solution of 0.10 gm polymer in 100 ml of 98% sulphuric acid at 25° C. Tm and Tg were measured by the DSC technique where Tg is the onset Tg process on heating an amorphous film while Tm is the peek of the melting endotherm.

The invention is further described but not in any limitative sense by means of the following examples.

EXAMPLE 1

To a 250 ml 3 necked round bottomed flask was purged 1,3-bis-(4-fluorobenzoyl)-benzene (16.28 g, 0.0505 mole) 4,4'-dihydroxybiphenyl (9.31 g, 0.0500 mole) and diphenyl sulphone (60.0 g). The flask was fitted with a nitrogen inlet, thermocouple, stirrer and stillhead/receiver and was then placed in a heated liquid metal bath.

When the internal temperature had reached about 160° C. and the flask contents were liquid, sodium carbonate (5.30 g, 0.050 mole) and potassium carbonate (0.14 g 0.001 mole) were added while stirring and maintaining a blanket of nitrogen. Following these additions the flask contents were heated as follows : 175° C. for 0.5 hrs, 200° for 0.52 hrs, 250° C. for 0.5 hrs and 300° C. for 0.66 hrs.

The product, by now a viscous polymer solution, was poured out onto an aluminium sheet, allowed to cool and then ground in a rotary hammer mill through a 3 mm screen.

The ground product was extracted in a glass sinter tube with acetone (2l) at 20° and water (2 l) at 80° C. to remove diphenyl sulphone and inorganic salt. The polymer was dried at 140° C. and found to have an IV 1.27 with the structure

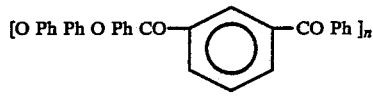

Differential scanning calorimetry (DSC) gave a glass transition temperature (Tg) of 160° C. and a crystalline melting temperature (Tm) of 305° C., $$\frac{Tg(°K.)}{Tm(°K.)} = 0.75.$$

Cooling from the melt at 20° C./min failed to induce crystallisation but cooling at 0.5° C./min gave 38% crystallinity (by DSC and assuming the polymer has the same heat of fusion as polyetheretherketone, PEEK). Annealing for 5 min at 270° C. gave 30% crystallinity.

EXAMPLE 2

A copolymer was prepared by a similar process to that described in Example 1 in which the 1,3-bis-(4-fluorobenzoyl)benzene was replaced by a mixture of 1,3-bis-(4 fluorobenzoyl)benzene (8.14 g 0.02525 mole) and 1,4-bis-(4-fluorobenzoyl) benzene (8.14 g, 0.02525 mole) i.e. a 50:50 mixture of the 'meta' and 'para' isomers.

The product had an IV 0.88 and contained the structures

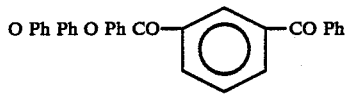

and

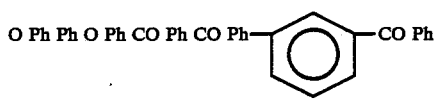

in equimolar amounts.

The Tg was 162° C. and two Tms were observable of 337° C. and 378° C. The level of crystallinity was 39% on cooling at 0.5° C./min from the melt.

EXAMPLE 3

A copolymer was prepared as in Example 2 but using 1,3-bis-(4 fluorobenzoyl)benzene (4.03 g, 0.0125 mole) and 1,4 bis-(4-fluorobenzoyl)-benzene (12.08 g, 0.0375 mole) i.e. a 25:75 mixture of the 'meta' and 'para' isomers.

The product had an IV of 0.33, Tg 154° C. and Tm 405° C. and a crystallinity of 59% on cooling at 0.5° C./min from the melt.

EXAMPLE 4

A polymer was prepared as in Example 1 except that 1,3-bis-(4-chlorobenzoyl)-benzene (17.94 g, 0.0505 mole) was used in place of the corresponding fluoro compound. Polymerisation was carried out at 300° C. for 4 hours 40 minutes.

This polymer had IV=1.05, Tg=152° C. and Tm=300° C. and gave a tough (creasable) film on moulding at 380° C. Crystallinity on cooling at 0.5° C./min was 38%.

COMPARATIVE EXAMPLE (This describes preparation of a meta linked polymer by the electrophilic route which fails to crystallise from the melt).

By the method of V Jansons and H C Gors (PCT No. 84/03891) a polymer was prepared from isophthaloyl chloride and diphenylether having the structure

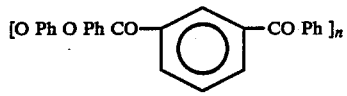

"As made" the product had Tg 155° and Tm 262° with a crystallinity of 31%. This polymer failed however, to crystallise from the melt and did not crystallise on holding at 230° C.

I claim:

1. A polyaryletherketone characterised by comprising repeating units of structures I and II:

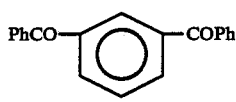

wherein Ph is 1,4-phenylene and Ar is 4,4'-biphenylene or 4,4" terphenylene, alone or in conjunction with other repeating units, the repeating units being connected by ether linkages.

2. A polyaryletherketone according to claim 1, which comprises repeating units of structure III:

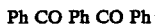

3. A polyaryletherketone according to claim 1 or claim 2, which comprises a minor proportion of repeating units selected from 2,6-naphthylene, 4,4'-diphenylsulphone, 4,4'-diphenylketone, 1,4-bis(4-phenylsulphonyl) benzene, 4,4'-bis(4-benzoyl)biphenyl and 4,4'-bis(4-phenylsulphonyl) biphenyl.

4. A polyaryletherketone according to anyone of the preceding claims, which Ar is 4,4'-biphenylene.

5. A polyaryletherketone according to any one of the preceding claims, which exhibits a degree of crystallinity of at least 30%.

6. A film, fibre or solvent resistant article, or composite material comprising a polyaryletherketone according to any one of the preceding claims.

7. A process for making a polyaryletherketone according to claim 1 comprising polycondensing under substantially anhydrous conditions in the presence of a base at least one compound of structure IV

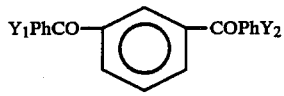

IV with at least one compound of structure V $$Y_3 \text{ Ar } Y_4 \qquad \qquad V$$

wherein Ar and Ph are as hereinbefore defined, $Y_1$, $Y_2$, $Y_3$ and $Y_4$ are each independently halogen or OH, and, when $Y_3$ and/or $Y_4$ is halogen, the group Ar is such that the halogen is activated by an inert electron—withdrawing group in at least one of the positions ortho- or para- to the halogen, and the proportions of IV and V and the nature of $Y_1$, $Y_2$, $Y_3$ and $Y_4$ are chosen so that the halogen and the groups—OH are in substantially equimolar amounts.

8. A process according to claim 7 wherein the polycondensation is carried out at a temperature of at least 175° C.

* * * * *